United States Patent [19]

Meyer et al.

[11] Patent Number: 5,526,425
[45] Date of Patent: Jun. 11, 1996

[54] INTERFACE CIRCUIT BETWEEN A FOUR WIRE LINE AND A TWO WIRE LINE

[75] Inventors: Johan G. Meyer, Rönninge; Gunnar A. Eriksson, Huddinge, both of Sweden

[73] Assignee: Telefonaktiebolaget LM Ericsson, Stockholm, Sweden

[21] Appl. No.: 334,075

[22] Filed: Nov. 4, 1994

[30] Foreign Application Priority Data

Nov. 9, 1993 [SE] Sweden ................... 9303689

[51] Int. Cl.[6] .............................. H04M 19/00
[52] U.S. Cl. ............... 379/402; 379/399; 379/413; 379/398
[58] Field of Search .................... 379/402, 403, 379/405, 398, 399, 413, 412

[56] References Cited

U.S. PATENT DOCUMENTS

| | | | |
|---|---|---|---|
| 3,973,089 | 8/1976 | Puckette | 379/404 |
| 4,387,273 | 6/1983 | Chea, Jr. | 379/398 |
| 4,617,426 | 10/1986 | Johansson et al. | 379/413 |
| 4,631,359 | 12/1986 | Johansson et al. | 379/413 |
| 4,631,360 | 12/1986 | Johansson et al. | 379/413 |
| 4,757,530 | 7/1988 | Arnon | 379/404 |
| 4,797,578 | 1/1989 | Eriksson | 327/525 |
| 4,853,959 | 8/1989 | Johansson | 379/413 |
| 4,961,222 | 10/1990 | Johansson et al. | 379/413 |
| 5,043,977 | 8/1991 | Lechner et al. | 370/32.1 |
| 5,172,407 | 12/1992 | Alenius | 379/124 |

FOREIGN PATENT DOCUMENTS

| | | |
|---|---|---|
| 046588 | 4/1983 | European Pat. Off. . |
| 134229 | 1/1984 | European Pat. Off. . |
| 167234 | 1/1986 | European Pat. Off. . |
| 272800 | 6/1988 | European Pat. Off. . |
| 3516670 | 11/1986 | Germany . |
| 446579 | 9/1986 | Sweden . |
| 448264 | 2/1987 | Sweden . |
| 2107559 | 4/1983 | United Kingdom . |
| 90/01837 | 2/1990 | WIPO . |

OTHER PUBLICATIONS

Kristiansson, Zetterberg—Signalteori, part 1, p. 114.
A. V. Oppenheim et al., "Digital Signal Processing", *Basic Network Structures for FIR Systems*, pp. 155–161.
A. Rydin et al., "Line Circuit Component SLIC for AXE 10", *Ericsson Review*, No. 4, pp. 192–200, (1983).
B. Widrow et al., "Adaptive Systems", *Adaptive Signal Processing*, pp. 3–26.

Primary Examiner—Jeffery Hofsass
Assistant Examiner—Jacques M. Saint-Surin
Attorney, Agent, or Firm—Burns, Doane, Swecker & Mathis

[57] ABSTRACT

An interface circuit between a four wire line and a two wire line includes correlator and control circuit means connected for receiving a longitudinal signal ($V_l$) and a transversal signal ($V_t$) corresponding to a differential signal received on the terminals of a two wire interface from the two wire line. The correlator and control circuit includes a circuit for creating a correction signals being a measure of the correlation between the longitudinal signal and the transversal signal. The circuit for creating the correction signal is connected for using this correction signal to adaptively control the amplifications in feed back loops so as to minimize the correlation between the longitudinal and transversal signals.

15 Claims, 3 Drawing Sheets

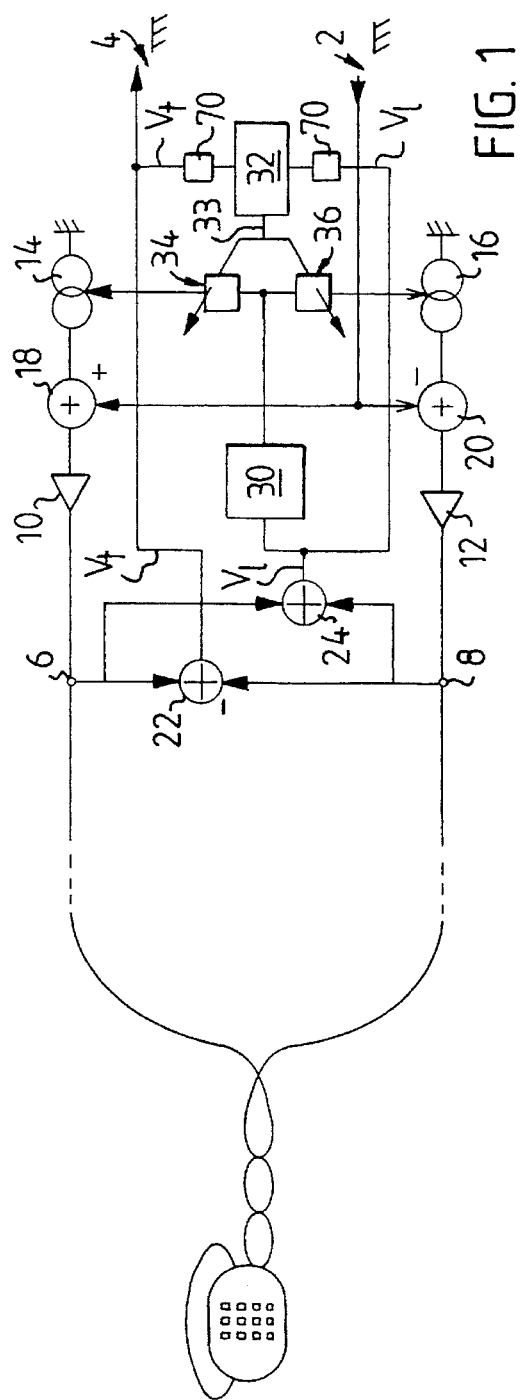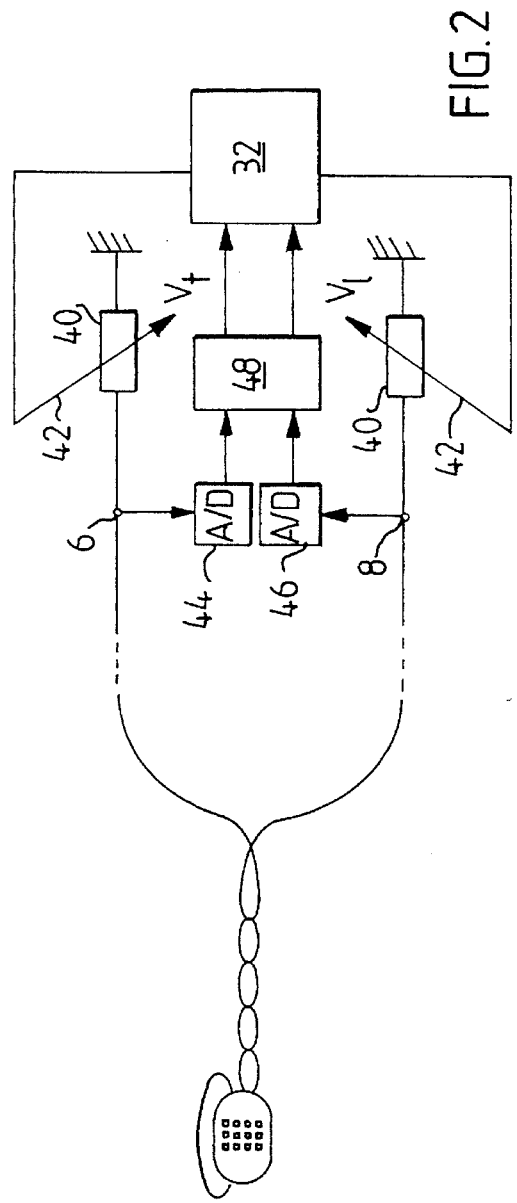

INTERFACE CIRCUIT BETWEEN A FOUR WIRE LINE AND A TWO WIRE LINE

BACKGROUND

The present invention relates to an interface circuit between a four wire line and a two wire line, including a four wire interface with a receive input and a send output, as well as a two wire interface including two terminals facing the two wire line, one for each wire. An output amplifier is located before each terminal. First circuit means apply, via the amplifiers, a signal received on the receive input as a differential signal on said terminals of the two wire interface. Second circuit means feed to the send output a differential signal received on said terminals of the two wire interface from the two wire line. Third circuit means form a longitudinal signal by means of the sum of voltages appearing on each of said terminals. A feed back loop extends to each amplifier for an adjustment signal which is derived from the longitudinal signal, for adjusting the impedances of the two wire interface to earth, the so called longitudinal terminating impedances so as to attain longitudinal balance.

Generally, a subscriber line is connected to a telephone exchange office via a so called two wire interface. The telephone exchange office is connected to other telephone exchange offices via a so called four wire interface. Two of the wires are used for sending speech signals to other exchange offices and the other two for receiving speech signals from other exchange offices.

A speech signal which is received on the four wire interface is passed on to the two wire interface where it appears as a transversal (differential) signal. If a transversal signal arriving from the subscriber appears in the two wire interface it will be passed on to the four wire interface and possibly further on to another exchange.

Today, integrated circuits are used for performing the transformation between the two and four wire interfaces. Such a circuit usually is denominated SLIC, Subscriber Line Interface Circuit. There are very high demands put on the SLIC that its so called longitudinal terminating impedances should be equal, i.e. the impedance from the two wire interface to earth should be equal for the wires of the two wire line.

External disturbances, e.g. from the power network or caused by a thunderstorm, may give rise to so called longitudinal signals on the two wire line. Besides that these longitudinal signals may disturb the speech signals, they may also give rise to harmful voltages in the two wire interface. Inversely, transversal signals, e.g. speech signals, may give rise to longitudinal signals. This may cause cross talk to two wire lines located nearby.

In order to obtain longitudinal balance good enough in a SLIC, trimming of amplifications in a number of signal paths has been used, cf. the Swedish patent 448,264, which discloses a circuit essentially of the kind defined by way of introduction. The trimming may be performed in several ways during the manufacture, e.g. by trimming thin film resistances by means of a laser.

A circuit likewise of essentially the kind defined by way of introduction is disclosed in the European patent 0,134,229, in which a method is described for automatically trimming the circuit in its location in the exchange office. More particularly, this method requires that the circuit is put into a trimming state, whereupon a number of signal connecting up and measuring operations followed by trimming adjustments are performed.

As an example of the general state of the art the following patent publications may besides be mentioned: SE-B 446,579, EP-A2 272,800, U.S. Pat. No. 4,387,273 and WO-A1 90/01837.

SUMMARY

One object of the invention is to enable with simple means, in a circuit of the kind defined by way of introduction, that adjustments of the longitudinal balance to maximum may be performed continuously when the circuit is in operation.

The circuit according to the invention comprises correlator and control circuit means connected for receiving the longitudinal signal and a transversal signal corresponding to the differential signal received on said terminals of the two wire interface from the two wire line. The correlator and control circuit means include circuit means for creating a correction signal being a measure of the correlation between the longitudinal signal and the transversal signal. The circuit means for creating the correction signal is connected for using this correction signal to adaptively control the amplifications in the feed back loops so as to minimize the correlation between the longitudinal and transversal signals.

There are many methods described for providing a longitudinal and a transversal signal, below also designated $V_1$ and $V_t$, respectively. Basically they are produced by forming the sum and the difference of the voltages on the wires of the two wire line:

$$V_t = V_{a\text{-wire}} - V_{b\text{-wire}}$$

$$V_1 = V_{a\text{-wire}} + V_{b\text{-wire}}$$

The invention is based on the understanding that the longitudinal balance will be ideal if the correlation between $V_t$ and $V_1$ is zero.

The principle is to adaptively control, in accordance with some known algorithm, e.g. LMS (Least Mean Square), the longitudinal terminating impedances so as to minimize the correlation between $V_t$ and $V_1$ and thereby maximize the longitudinal balance.

Adaptive systems are characterized in that they are self-adjustingly varying with time, i.e. they search for an optimum all the time. They take into consideration a changeable environment, e.g. components the values of which vary with time, are unknown or diverge much, cf. Adaptive Signal Processing, Widrow & Stearns, ISBN 0-13-004029-0.

That attained in accordance with the invention will henceforth also be called "adaptive longitudinal balance".

In a first embodiment the correlator and control means include a correlator circuit connected for receiving the longitudinal signal ($V_1$) and the transversal signal ($V_t$) and realized so as to create the correction signal by means of these signals, and control circuit means connected for receiving the correction signal and located in the feed back loops, and including means for correcting, by means of the correction signal, the adjustment signal so as to minimize the correlation between the longitudinal and transversal signals.

The control circuit means may suitably include delays with adjustable coefficients enabling phase shifts in the current response of the impedances.

A first embodiment of the correlator circuit may include a comparator which receives the longitudinal signal and the transversal signal on its inputs and which on its output emits a signal indicative of the sign of the product of said two signals and is fed to an integrator on the output of which the correction signal appears.

A second embodiment of the correlator circuit may include a multiplier which forms the product of the longitudinal signal and the transversal signal and emits it to an integrator from which the correction signal is obtained.

In a third embodiment of the correlator circuit means are provided for converting the transversal signal into a digital signal, and the correlator circuit works with a digital sign algorithm which from said digital signal and the sign of the longitudinal signal provides a signal which after digital/analogue conversion results in the correction signal.

In a further embodiment of the circuit according to the invention the signals on said terminals of the two wire interface may be fed via each an A/D converter to a circuit for digital signal treatment, in which they are treated for creation of the longitudinal signal ($V_1$) and the transversal signal ($V_t$), which are forwarded to said correlator and control means. The correlator circuit may then be divided into a first separate correlator part in which a digital transversal signal in the receiving direction in the four wire interface is correlated with the digital longitudinal signal ($V_1$) from the two wire interface, and a second separate correlator part in which a digital longitudinal receiver signal, if any, in the four wire interface is correlated with the digital transversal signal ($V_t$) from the two wire interface.

In a further embodiment of the invention components with great spread in their component values may advantageously be included in the circuit parts which shall be exposed to adaptive adjustment.

In still a further advantageous embodiment the circuit according to the invention may be combined with means for adaptive signal extinction of the signal fed to the send output of the four wire interface.

BRIEF DESCRIPTION OF THE DRAWINGS

Embodiments of the invention will now be described more closely below with reference to the attached drawings, on which FIG. 1 is a simplified circuit diagram for illustrating the principle of the invention, FIGS. 2 and 3 are further simplified circuit diagrams showing respective embodiments of the principle illustrated in FIG. 1, FIGS. 4 and 5 in similar circuit diagrams as in FIGS. 2 and 3 show cases of use which illustrate advantages of the invention.

DETAILED DESCRIPTION

Figure 3:
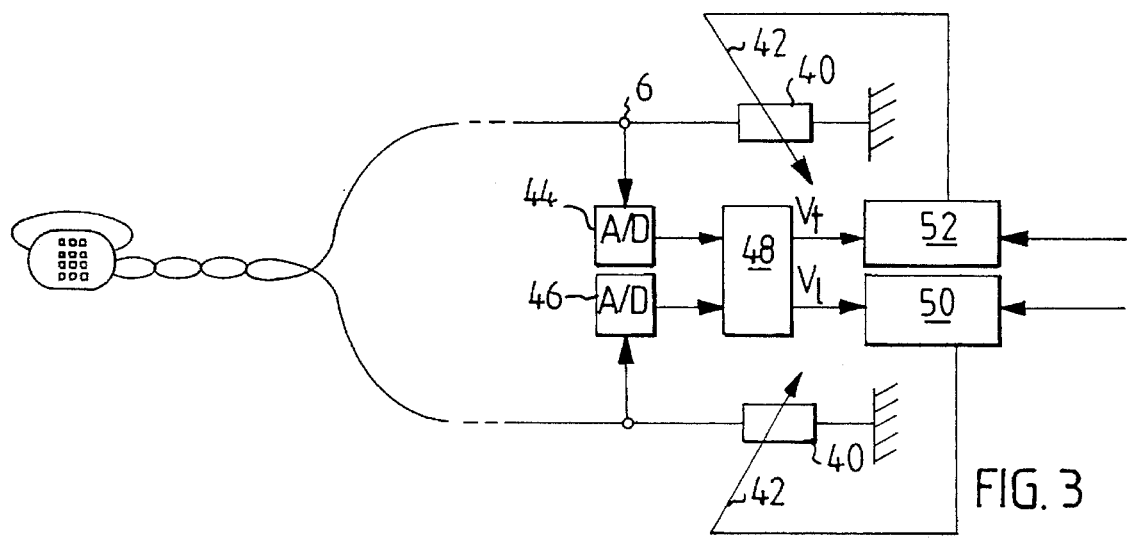

In the different embodiments described below the same reference characters are used for designating the same or similar elements in the different figures.

FIG. 1 shows an interface circuit of SLIC type between a four wire line and a two wire line. It includes, on the one hand, a four wire interface with a receive input 2 and a send output 4, on the other hand, a two wire interface including two terminals 6 and 8 facing the two wire line, one for each wire. A respective output amplifier 10 and 12 and a respective current generator 14 and 16 are connected to each terminal.

The circuit includes first circuit means, schematically illustrated in the form of adders 18, 20, for applying via the amplifiers 10 and 12 a signal received on the receive input 2 as a differential signal on said terminals 6, 8 of the two wire interface. Furthermore the circuit includes second circuit means, schematically shown as a subtracting element 22, for feeding a differential signal $V_t$ received from the two wire line on said terminals of the two wire interface 6, 8, to the send output 4.

Furthermore there are third circuit means, schematically illustrated in the form of an adder 24, for forming a longitudinal signal $V_1$ by means of the sum of voltages appearing on each one of the terminals 6, 8. A respective feed back loop 26 and 28 for an adjusting signal extends via the respective current generators 14 and 16 to each amplifier 10 and 12. This adjusting signal is derived from the longitudinal signal $V_1$ in a circuit 30 for adjusting the impedances 10, 18, 14 and 12, 20, 16, respectively, of the two wire interface to earth, i.e. the so called longitudinal terminating impedances. The adjustment signal may be created in the circuit 30 in a way not described here in detail, by comparing the longitudinal signal $V_1$ with a longitudinal reference.

That described thus far may be technique of the kind which is e.g. known through the above mentioned Swedish patent 448,264 or European patent 0,134,229, and also through the article "LINE CIRCUIT COMPONENT SLIC FOR AXE 10" in Ericsson Review No. 4, 1983. Further description is therefore not required here, since details may be found in e.g. the publications just mentioned.

According to the invention there are furthermore correlator and control circuits which are connected for receiving the longitudinal signal $V_1$ and a transversal signal $V_t$ corresponding the differential signal received from the two wire line on said terminals of the two wire interface.

These correlator and control circuits include a correlator circuit 32 realized to create a correction signal 33 being a measure of the correlation between the longitudinal signal $V_1$ and the transversal signal $V_t$. By means of this correction signal there is performed an adaptive control in control circuits 34 and 36, respectively, of the amplifications in the feed back loops so as to minimize the correlation between $V_1$ and $V_t$. More particularly, the control circuits 34, 36 in the embodiment according to FIG. 1, are realized to correct said adjustment signal by means of the correction signal and located before each one of the current generators 14 and 16, respectively. As regards the detailed realization of such an adaptive system in general, reference is made to the above mentioned document Adaptive Signal Processing, Widrow & Stearns, ISBN 0-13-004029-0. Henceforth the denomination "adaptive control loop" will be used for the control loops extending from the elements 22, 24 via the correlator circuit 32 and the respective control circuits 34 and 36, and elements 14, 18, 10 and 16, 20, 12, respectively, back to the elements 22, 24.

In FIGS. 2–5, which show different embodiments, there are included, for the sake of clearness, mainly only those circuit parts which take care of the signal flow for obtaining adaptive longitudinal balance in accordance with the invention. Circuit parts taking care of the normal signal flow between the two wire and four wire interfaces are thus not shown. The longitudinal terminating impedances are represented only by blocks 40, and the adjustment of these is illustrated by arrows 42 extending directly from the correlator circuit 32 to these blocks 40.

The realization of the adaptive longitudinal balance may be made by means of digital or analogous signal treatment.

FIG. 2 shows a possible realization by means of digital signal treatment where the signals on the terminals 6 and 8 of the two wire interface are fed, via an A/D converter 44 and 46, respectively, to a digital signal treatment circuit 48 for creating $V_t$ and $V_1$. A/D and D/A converters may, however, be located in other conceivable positions in the circuit.

A modification of the solution in FIG. 2 is shown in FIG. 3. The transversal signal in the receiving direction in the four wire interface most often is digital. In a first separate correlator part 50 it may suitably be correlated with the longitudinal signal $V_1$ from the two wire interface 6, 8. A digital longitudinal received signal, if any, in the four wire interface may in a corresponding way be correlated with a transversal signal $V_t$ from the two wire interface 6, 8 in a second separate correlator part 52. The advantage is that more control of the incoming signals is obtained.

Figure 4:
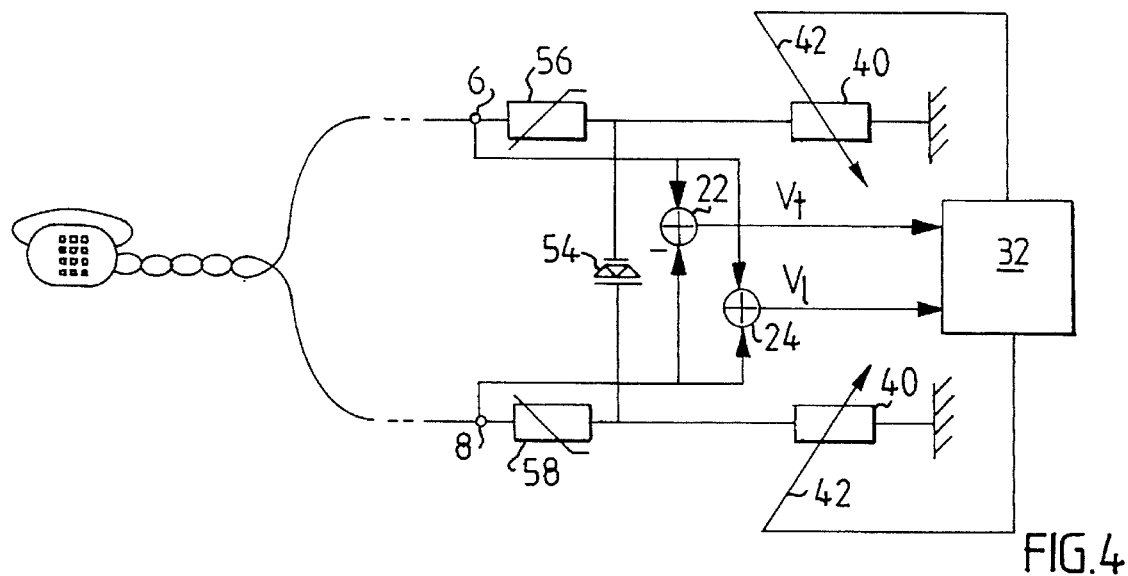

In order to really use the adaptive longitudinal balancing in accordance with the invention one may, with reference to FIG. 4, let components with great spread of the component values, e.g. over voltage protection elements 54, 56, 58, be included in the adaptive control loop before the terminals 6, 8 of the two wire interface.

Figure 5:
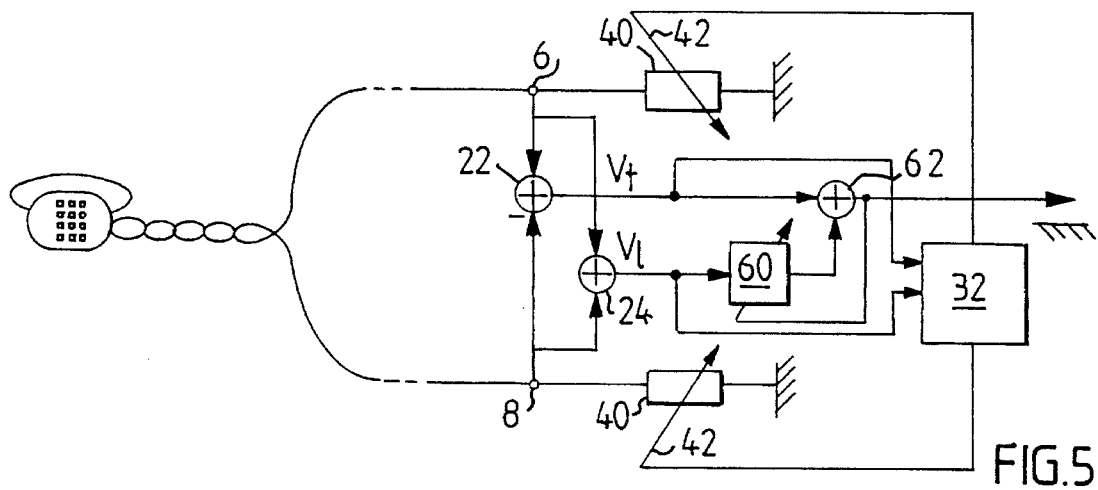

In order to further increase the quality of the speech signal one may, with reference to FIG. 5, combine the adaptive control according to the invention with adaptive signal extinction. In the Figure a variable filter is designated 60 to which the longitudinal signal is fed for creating a negative copy thereof. The negative copy is added to the transversal signal in an adder 62 the output signal of which is used for controlling the filter 60. Such adaptive signal extinction is a method used in many connections but may not be used alone since it cannot cope with the problem of cross-talk to nearby located two wire line pairs. The latter is, however, dealt with by means of the adaptive control according to the invention.

Here different embodiments of the blocks 32, 34 and 36 in FIG. 1 will now be described more in detail. At first, however, conceivable algorithms used in connection with creating the correction signal in the correlator circuit 32 will be briefly discussed.

When there is unbalance longitudinal signals will exist in the transversal signal and vice versa. In other words, the measured object is balanced if the transversal and longitudinal signals are uncorrelated.

Two signals, such as $V_t$ and $V_1$, although denominated x(t) and y(t) in the discussion below, are uncorrelated at the times t1 and t2, respectively, if, and only if, the correlation coefficient Rxy(t1,t2) is equal to zero, cf. Kristiansson, Zetterberg - Signalteori, part 1, and $$Rxy(t1,t2) = \frac{E((x(t1) - mx(t1)) * (y(t2) - my(t2)))}{sx(t1) * sy(t2)} \quad (1)$$

where m in mx(t) and my(t) symbolizes that there is the question of mean values of the signals, and s in sx(t) and sy(t) symbolizes that there is the question of the variance of the signals.

Thus, a good error signal is thus the idle value of the product of the two signals with the DC components filtered away. In FIG. 1 filter circuits for filtering away the DC components are indicated at 70.

If t1 and t2 are equal and one tries to minimize the above error signal it is only the resistive unbalance which is compensated for. To be able to balance the capacitive or inductive unbalance, i.e. the signals themselves are phase shifted, one has to consider two cases. These will be found by means of a cross correlation matrix.

$$\begin{matrix} x(0)*y(0) \; x(1)*y(0) \ldots x(n)*y(0) \\ x(0)*y(1) \; x(1)*y(1) \ldots x(n)*y(1) \\ \vdots \\ x(0)*y(n) \; x(1)*y(1) \ldots x(n)*y(n) \end{matrix} \quad (2)$$

Either the contents y in x is minimized using the columns of the matrix, or also the contents x in y using the rows of the matrix. The "resistive" correlation corresponds to the diagonal x(0) ,y(0) , x(1) ,y(1) . . . x(n) *y(n) in the matrix.

A sign algorithm for resistive balancing is obtained if one, instead of performing multiplication in the correlation measurement, compares the signs of the two signals in order to get hold of whether the correlation is positive or negative.

Updating of the variable quantities, i.e. in the present case the change of the longitudinal balance, is performed in a fixed step. Updating of the resistances is performed according to a pattern which may be derived by means of a heuristic reasoning as follows.

Figure 6:
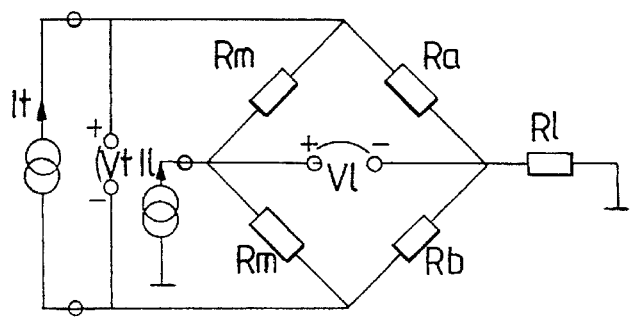
FIG. 6 is a circuit diagram of a simulating model for signal treatment in connection with the invention.

FIG. 6 illustrates a simulating model for the treatment of the longitudinal and transversal signals. Ra and Rb correspond to the longitudinal input impedances together with R1. R1 has a negative value in order to get the transversal impedance correct. Rm is a measuring resistance. In Ra and Rb errors are introduced which shall be adapted away. It and I1, respectively, are currents giving rise to unbalance voltages $V_1$ and $V_t$, respectively.

In case of a longitudinal signal, i.e. It=0 the error signal is produced by forming sign($V_t(t),V_1(t)$), i.e. the sign of the product within brackets. If Ra is too big the amount of Va will be greater than the amount of Vb, i.e. $V_t$ is separated from zero. In order to get balance, Ra shall be reduced and Rb increased. The opposite is true if Rb is too big.

The following table may be set up:

| $V_t$ | $V_1$ | sign ($V_t * V_1$) | Ra | Rb | |
|---|---|---|---|---|---|
| neg. | neg. | pos. | decrease | increase | |
| neg. | pos. | neg. | increase | decrease | (3) |
| pos. | neg. | neg. | increase | decrease | |
| pos. | pos. | pos. | decrease | increase | |

The same discussion may be used if a transversal signal is put on, i.e. Il=0. This will give the same relation between detected signs and correction.

The updating algorithm for Ra and Rb will thus be:

$$Ra(t)=Rb(t-to)-\mu* \; sign(V_t(t-to)*V_1(t-to)) \quad (4)$$

$$Rb(t)=Rb(t-to)-\mu* \; sign(V_t(t-to)*V_1(t-to))$$

The positive constant µ determines how fast the algorithm converges and how big the remaining error is.

The advantage of the sign algorithm is that it is very simple.

A faster but somewhat more complex updating algorithm is obtained if the multiplication is performed in the correlation measurement. Updating is otherwise done as in the sign algorithm. The factor µ should be conversely proportional to the power of the signal, for the algorithm to be really effective. If both a transversal and a longitudinal signal appears µ has to be greatly decreased for having the algorithm to converge.

$$Ra(t)=Ra(t-to)-\mu^* \text{sign}(V_t(t-to)*V_1(t-to)) \quad (5)$$

$$Rb(t)=Rb(t-to)-\mu^* \text{sign}(V_t(t-to)*V_1(t-to))$$

Figure 7:
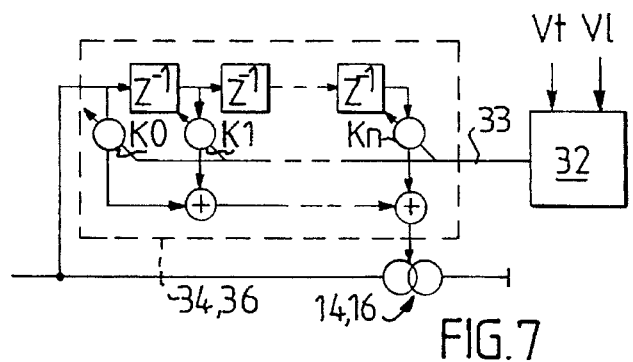
FIG. 7 shows a circuit diagram of an embodiment of a control means included in FIG. 1, and FIGS. 8–10 show circuit diagrams of different embodiments of a correlator circuit included in FIG. 1.

FIG. 7 shows an embodiment of the control circuits 34, 36 where they, in order to obtain a complex balancing, include delays $Z^{-1}$ with adjustable coefficients. By means of these delays phase shifts may be created in the current response of the impedances. More particularly, the control circuits 34 and 36 may be so called FIR-filters (FIR=Finite Impulse Response). FIR-filters are well known within the art of digital signal processing and are i.a. described in DIGITAL SIGNAL PROCESSING, by Alan V Oppenheim and Ronald W Schafer.

The coefficients k in the FIR filter may be adjusted and describe the correlation between $V_t$ and $V_1$ in a way that depends on the fact whether rows or columns are chosen in the cross correlation matrix (1).

Figure 8:
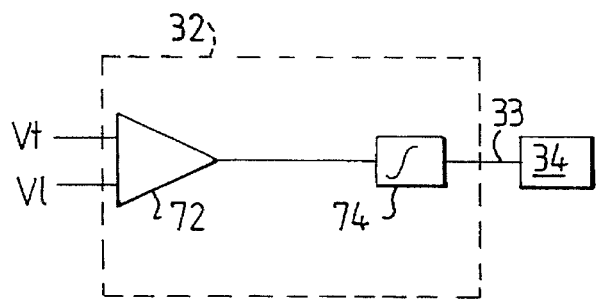

An embodiment of the correlator circuit 32 working according to the sign algorithm (4) in the analogue version is shown in FIG. 8. A comparator 72 receives the signals $V_t$ and $V_1$ provides an output signal that follows the table (3), i.e. plus/minus a constant voltage, and is fed to an integrator 74 on the output of which the correction signal 33 appears, which is fed to the control circuits 34 and 36.

Figure 9:
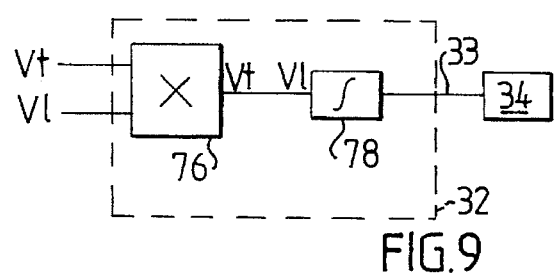

In FIG. 9 there is shown an embodiment of the correlator circuit 32 which uses the product of $V_t$ and $V_1$, obtained from a multiplier 76. The product is integrated in an integrator 78 which at attainment of steady-state provides a constant output voltage. This voltage is a measure of the badness of the balance. This corresponds to the above described proportional algorithm (5).

Figure 10:
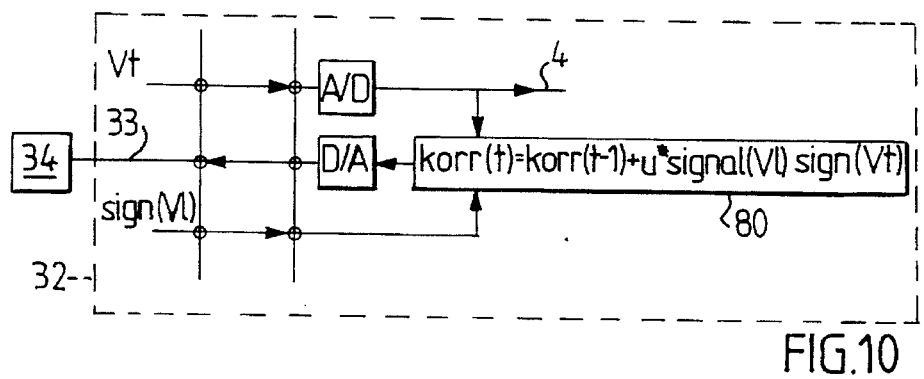

In FIG. 10 a further embodiment of the correlator circuit 32 is shown, in which the transversal signal is converted into digital form by an A/D converter and is received by a circuit 80 working with a digital sign algorithm. More particularly, this algorithm states that the correction at the time t is equal to the correction at the time $(t-1)+\mu^*\text{sign}(V_1),\text{sign}(V_t)$. The signal created by this digital sign algorithm results in the correction signal 33 after conversion in a D/A converter. Since the system is time discrete, problems arise with respect to folding distortion implying that $V_t$ and $V_1$ must be band limited. The analogous proposals do not have these problems.

What is claimed is:

1. An interface circuit between a four-wire line and a two-wire line, comprising:

a four-wire interface having a receive input and a send output;

a two-wire interface including two terminals facing the two-wire line, one terminal for each wire of the two-wire line;

an output amplifier before each terminal of the two-wire interface;

first circuit means for applying, via the output amplifiers, a signal received on the receive input as a differential signal on the terminals of the two-wire interface;

second circuit means for feeding a differential signal, received on the terminals of the two-wire interface from the two-wire line, to the send output;

third circuit means for forming a longitudinal signal by summing voltages appearing on each of the connection terminals;

a feedback loop to each amplifier for an adjustment signal which is derived from the longitudinal signal, for adjusting the impedances of the two-wire interface to earth so as to attain longitudinal balance;

a correlator and control circuit connected for receiving the longitudinal signal and a transversal signal corresponding to the differential signal received on the terminals of the two-wire interface from the two-wire line; and circuit means for creating a correction signal, wherein the correction signal is a measure of the correlation between the longitudinal signal and the transversal signal and is connected to adaptively control amplifications in the feedback loops so as to minimize the correlation between the longitudinal and transversal signals.

2. The interface circuit of claim 1, wherein the correlator and control circuit includes:

a correlator circuit that receives the longitudinal signal and the transversal signal and generates the correction signal based on these signals; and a control circuit that receives the correction signal and is disposed in the feedback loops, the control circuit including means for correcting, based on the correction signal, the adjustment signal so as to minimize the correlation between the longitudinal and transversal signals.

3. The interface circuit of claim 2, wherein the control circuit includes delays having adjustable coefficients for generating phase shifts in the current response of the impedances.

4. The interface circuit of claim 2, wherein the correlator circuit includes a comparator which receives the longitudinal signal and the transversal signal on its inputs and which on its output emits a signal indicative of the sign of the product of the longitudinal and transversal signals and is fed to an integrator on the output of which the correction signal appears.

5. The interface circuit of claim 2, wherein the correlator circuit includes a multiplier for forming the product of the longitudinal signal and the transversal signal and for providing the product to an integrator from which the correction signal is obtained.

6. The interface circuit of claim 2, further comprising means for converting the transversal signal into a first digital signal, wherein the correlator circuit generates a second signal based on the first digital signal and the sign of the longitudinal signal, and the second signal results in the correction signal after digital/analogue conversion.

7. The interface circuit of claim 1, wherein the signals on the terminals of the two-wire interface are each fed via an A/D converter to a circuit for digital signal treatment, the digital signal treatment circuit generating the longitudinal signal and the transversal signal, which are forwarded to the correlator and control circuit.

8. The interface circuit of claim 2, wherein the correlator circuit comprises:

a first correlator part for correlating a digital transversal signal in the receiving direction in the four-wire interface with a digital longitudinal signal ($V_1$) from the two-wire interface; and a second correlator part for correlating a digital longitudinal receiver signal in the four-wire interface with a digital transversal signal ($V_t$) from the two-wire interface.

9. The interface circuit of claim 1, further comprising means for adaptive signal filtering of the signal fed to the send output of the four-wire interface.

10. The interface circuit of claim 3, wherein the correlator circuit includes a comparator which receives the longitudinal signal and the transversal signal on its inputs and which on its output emits a signal indicative of the sign of the product of the longitudinal and transversal signals and is fed to an integrator on the output of which the correction signal appears.

11. The interface circuit of claim 3, wherein the correlator circuit includes a multiplier for forming the product of the longitudinal signal and the transversal signal and for providing the product to an integrator from which the correction signal is obtained.

12. The interface circuit of claim 3, further comprising means for converting the transversal signal into a first digital signal, wherein the correlator circuit generates a second signal based on the first digital signal and the sign of the longitudinal signal, and the second signal results in the correction signal after digital/analogue conversion.

13. The interface circuit of claim 2, wherein the signals on the terminals of the two-wire interface are each fed via an A/D converter to a circuit for digital signal treatment, the digital signal treatment circuit generating the longitudinal signal and the transversal signal, which are forwarded to the correlator and control circuit.

14. The interface circuit of claim 7, wherein the correlator circuit comprises:

a first correlator part for correlating a digital transversal signal in the receiving direction in the four-wire interface with a digital longitudinal signal ($V_1$) from the two-wire interface; and a second correlator part for correlating a digital longitudinal receiver signal in the four-wire interface with a digital transversal signal ($V_t$) from the two-wire interface.

15. The interface circuit of claim 13, wherein the correlator circuit comprises:

a first correlator part for correlating a digital transversal signal in the receiving direction in the four-wire interface with a digital longitudinal signal ($V_1$) from the two-wire interface; and a second correlator part for correlating a digital longitudinal receiver signal in the four-wire interface with a digital transversal signal ($V_t$) from the two-wire interface.

* * * * *